United States Patent
Ljung et al.

(10) Patent No.: US 11,184,911 B2
(45) Date of Patent: Nov. 23, 2021

(54) MITIGATION OF OVERHEATING EVENTS AT COMMUNICATION DEVICES

(71) Applicant: Sony Group Corporation, Tokyo (JP)

(72) Inventors: Rickard Ljung, Helsingborg (SE); Lars Nord, Lund (SE); Anders Berggren, Lund (SE)

(73) Assignee: Sony Group Corporation, Tokyo (JP)

( * ) Notice: Subject to any disclaimer, the term of this patent is extended or adjusted under 35 U.S.C. 154(b) by 9 days.

(21) Appl. No.: 16/603,382

(22) PCT Filed: Apr. 23, 2018

(86) PCT No.: PCT/EP2018/060286
§ 371 (c)(1),
(2) Date: Oct. 7, 2019

(87) PCT Pub. No.: WO2018/193131
PCT Pub. Date: Oct. 25, 2018

(65) Prior Publication Data
US 2020/0053763 A1  Feb. 13, 2020

(30) Foreign Application Priority Data
Apr. 21, 2017  (EP) .................................... 17167522

(51) Int. Cl.
*H04W 72/12* (2009.01)
*H04W 72/04* (2009.01)
(Continued)

(52) U.S. Cl.
CPC ....... *H04W 72/1284* (2013.01); *H04L 5/0053* (2013.01); *H04W 24/04* (2013.01); *H04W 72/0413* (2013.01); *H04W 72/14* (2013.01)

(58) Field of Classification Search
CPC ..... H04W 24/04; H04W 52/60; H04W 52/34; H04W 52/267; H04W 28/0231;
(Continued)

(56) References Cited

U.S. PATENT DOCUMENTS 6,538,994 B1 *  3/2003  Horspool .............. H04L 1/0002
370/230
8,295,304 B1 * 10/2012  Smidth ................. H04L 1/0003
370/468
(Continued)

FOREIGN PATENT DOCUMENTS

JP       2008011261 A  *  1/2008  ............ H04W 52/04
WO        0031990  A2     6/2000
WO    WO2020210516 A1 * 10/2020

OTHER PUBLICATIONS

Using Cognitive Radio for Interference-Resistant Industrial Wireless Sensor Networks: An Overview by Tapiwa M. Chiwewe; Colman F. Mbuya; Gerhard P. Hancke Published in: IEEE Transactions on Industrial Informatics (vol. 11, Issue: 6, Dec. 2015) (Year: 2015).*

(Continued)

*Primary Examiner* — William D Cumming
(74) *Attorney, Agent, or Firm* — Tucker Ellis LLP

(57) ABSTRACT

A method for mitigating overheating events is provided. The method includes communicating, on a wireless link between a network node and a communication device, first data at a first data rate. The method further includes communicating, on the wireless link, at least one uplink control signal associated with an overheating event at the communication device. In response to said communicating of the at least one uplink control signal, the method includes communicating, on the wireless link, second data at a second data rate, wherein the second data rate is different from the first data rate.

20 Claims, 11 Drawing Sheets

(51) Int. Cl.
  *H04W 72/14* (2009.01)
  *H04W 24/04* (2009.01)
  *H04L 5/00* (2006.01)

(58) Field of Classification Search
  CPC . H04W 28/24; H04W 28/0289; H04W 28/14;
         H04W 16/14
  USPC ........................................ 370/230, 252, 468
  See application file for complete search history.

(56) References Cited

U.S. PATENT DOCUMENTS

| | | | | |
|---|---|---|---|---|
| 8,320,495 | B2* | 11/2012 | Kashiwase | H04W 52/267 |
| | | | | 375/295 |
| 8,559,326 | B2* | 10/2013 | Lientz | H04W 28/24 |
| | | | | 370/252 |
| 8,989,217 | B2* | 3/2015 | Smidth | H04L 47/6225 |
| | | | | 370/468 |
| 9,497,658 | B2* | 11/2016 | Lientz | H04L 41/0896 |
| 10,194,351 | B2* | 1/2019 | Lientz | H04W 28/14 |
| 10,980,039 | B2* | 4/2021 | Fodor | H04W 16/14 |
| 2008/0046132 | A1 | 2/2008 | Dalsgaard et al. | |
| 2009/0215442 | A1 | 8/2009 | Lindoff et al. | |
| 2010/0018962 | A1* | 1/2010 | Kabasin | G05D 23/1906 |
| | | | | 219/482 |
| 2010/0061480 | A1* | 3/2010 | Kashiwase | H04W 52/34 |
| | | | | 375/295 |
| 2012/0120818 | A1* | 5/2012 | Lientz | H04W 28/0231 |
| | | | | 370/252 |
| 2013/0017851 | A1 | 1/2013 | Kim | |
| 2013/0039173 | A1* | 2/2013 | Ehsan | H04W 52/60 |
| | | | | 370/229 |
| 2013/0044626 | A1* | 2/2013 | Smidth | H04L 12/54 |
| | | | | 370/252 |
| 2014/0043970 | A1* | 2/2014 | Lientz | H04L 41/0896 |
| | | | | 370/230 |
| 2017/0055180 | A1* | 2/2017 | Lientz | H04W 28/0289 |
| 2019/0261387 | A1* | 8/2019 | Fodor | H04W 16/14 |
| 2020/0022145 | A1* | 1/2020 | Huang | H04W 72/042 |
| 2020/0053763 | A1* | 2/2020 | Ljung | H04W 24/04 |

OTHER PUBLICATIONS

Downlink Packet Scheduling in LTE Cellular Networks: Key Design Issues and a Survey by F. Capozzi; G. Piro; L.A. Grieco; G. Boggia; P. Camarda Published in: IEEE Communications Surveys & Tutorials (vol. 15, Issue: 2, Second Quarter 2013) Jul. 2012 (Year: 2012).*

Dynamic switching with heterogeneous channels in multichannel 802.11 WLANs by Juan J. Galvez, Nitin Vaidya Published in: 2015 12th Annual IEEE International Conference on Sensing, Communication, and Networking (SECON) Nov. 2015 (Year: 2015).*

International Search Report and Written Opinion from corresponding International Patent Application No. PCT/EP2018/060286, dated Jun. 27, 2018, 13 pages.

LG Electronics Inc., "Assistance information for UE requested configuration change", 3GPP TSG-RAN2 Meeting #97Bis, Spokane, USA, Apr. 3-7, 2017, [retrieved online] <http://www.3gpp.org/ftp/Meetings_3GPP_SYNC/RAN2/Docs/>, 4 pages.

Huawei et al., "Thermal issues with high capability UEs", 3GPP TSG-RAN WG2 #97, Athens, Greece, Feb. 13-17, 2017, [retrieved online] <http://www.3gpp.org/ftp/Meetings_3GPP_SYNC/RAN2/Docs/>, 5 pages.

Huawei et al.: "Output of RAN2#97b offline discussion #13 on UE requested configuralion changes"; 3GPP TSG-RAN WG2 #97bis; R2-1703939, Apr. 3-7, 2017, 2 pages.

Huawei: "Report of email discussion [97#59][LTE/TEI14] UE requested configuration changes"; 3GPP TSG-RAN WG2 #97bis; R2-1703475, Apr. 3-7, 2017, 14 pages.

* cited by examiner

MITIGATION OF OVERHEATING EVENTS AT COMMUNICATION DEVICES

TECHNICAL FIELD

Various examples of the invention generally relate to communicating data on a wireless link. Various examples of the invention specifically relate to implementing data rates for said communicating of data in order to mitigate an overheating event at a communication device participating in set communicating of data.

BACKGROUND

For facilitating wireless communication in a network, sometimes multiple-input multiple-output (MIMO) techniques are employed. Here, for transmitting and/or receiving (communicating) data on a wireless link, multiple antennas are used as a phased array. Antenna weights, sometimes also referred to as precoding coefficients, define the amplitude and phase relationship between the various antennas.

MIMO techniques are sometimes employed at base stations (BSs). MIMO techniques are sometimes also employed in portable communication devices (user equipment, UE). Here, situations have been observed where the work load imposed on circuitry for controlling, modulating, demodulating, sending and receiving MIMO communication is high so that overheating events occur. An overheating event may relate to a scenario where the temperature of the circuitry exceeds a certain threshold. Damage may result from overheating events, in particular, if persistent over an extended period of time. Generally, overheating events may not only be triggered by MIMO communication, but also by other tasks that impose a significant workload on circuitry of a UE. Examples include carrier aggregation or modulation schemes using high constellations.

Reference implementations of mitigating overheating events include the UE detaching and then re-attaching to the network. After re-attaching, the UE may report a lower carrier aggregation or reduced MIMO capability to the network by means of a UE capability transfer procedure. This may be indicated by transmitting a different UE capability after the re-attach, as compared to prior the re-attach. Such techniques may face certain restrictions and drawbacks. For example, the quality of service may be severely affected by detaching and re-attaching to the network. Increased latency may result.

Further techniques of mitigating overheating include indication of the temperature at the UE. See Third Generation Partnership Project (3GPP) TSG-RAN WG2 #97bis, R2-1703939. Then, the MIMO capability or carrier aggregation may be degraded. See 3GPP TSG-RAN WG2 #97bis R2-1703475.

SUMMARY

There is a need of advanced techniques of mitigating overheating events.

This need is met by the features of the independent claims. The features of the dependent claims define embodiments.

A method includes communicating, on a wireless link between a network node and a UE, first data at a first data rate. The method further includes communicating, on the wireless link, at least one uplink control signal associated with an overheating event at the UE. The method further includes in response to said communicating of the at least one uplink control signal: communicating, on the wireless link, second data at a second data rate. The second data rate is different from the first data rate.

A method includes transmitting and/or receiving, on a wireless link between a network node and a UE, first data at a first data rate. The method further includes transmitting and/or receiving, on the wireless link, at least one uplink control signal associated with an overheating event at the UE. The method further includes in response to said transmitting and/or receiving of the at least one uplink control signal: transmitting and/or receiving, on the wireless link, second data at a second data rate. The second data rate is different from the first data rate.

A computer program product includes program code that can be executed by at least one processor. Executing the program code causes the at least one processor to perform a method. The method includes communicating, on a wireless link between a network node and a UE, first data at a first data rate. The method further includes communicating, on the wireless link, at least one uplink control signal associated with an overheating event at the UE. The method further includes in response to said communicating of the at least one uplink control signal: communicating, on the wireless link, second data at a second data rate. The second data rate is different from the first data rate.

A computer program includes program code that can be executed by at least one processor. Executing the program code causes the at least one processor to perform a method. The method includes communicating, on a wireless link between a network node and a UE, first data at a first data rate. The method further includes communicating, on the wireless link, at least one uplink control signal associated with an overheating event at the UE. The method further includes in response to said communicating of the at least one uplink control signal: communicating, on the wireless link, second data at a second data rate. The second data rate is different from the first data rate.

A device includes control circuitry configured to: communicate, on a wireless link between a network node and a UE, first data at a first data rate; and communicate, on the wireless link, at least one uplink control signal associated with an overheating event at the UE; and in response to said communicating of the at least one uplink control signal: communicate, on the wireless link, second data at a second data rate. The second data rate is different from the first data rate.

A method includes communicating, on a wireless link between a network node and a UE, first data at a first data rate. The method further includes receiving, on the wireless link, at least one uplink control signal associated with an overheating event at the UE. The method further includes in response to said communicating of the at least one uplink control signal: communicating, on the wireless link, second data at a second data rate. The second data rate is different from the first data rate.

A method includes communicating, on a wireless link between a network node and a UE, first data at a first data rate. The method further includes transmitting, on the wireless link, at least one uplink control signal associated with an overheating event at the UE. The method further includes in response to said communicating of the at least one uplink control signal: communicating, on the wireless link, second data at a second data rate. The second data rate is different from the first data rate.

A system includes a UE and a BS. The UE includes first control circuitry. The BS includes second control circuitry. The first control circuitry and the second control circuitry are configured to communicate, on a wireless link between the BS and the UE, first data at a first data rate. The first control circuitry is configured to transmit, on the wireless link, at least one uplink control signal associated with an overheating event at the UE. The second control circuitry is configured to receive the uplink control signal. The first control circuitry and the second control circuitry are configured to communicate, on the wireless link, second data at a second data rate. The second data rate is different from the first data rate.

For example, the at least one uplink control signal may include an indicator indicative of a threshold data rate, the second data may be communicated at the second data rate which is implemented in accordance with the threshold data rate.

For example, the at least one uplink control signal may include an indicator indicative of a data rate, the second data may be communicated at the second data rate which is implemented in accordance with the data rate indicated by the indicator.

The techniques facilitate reduction of the latency associated with implementing an adjusted data rate. This enables to efficiently mitigate the overheating event.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 9 schematically illustrates a time dependency of the data rate and the temperature associated with an overheating event at the UE according to various examples, wherein FIG. 9 illustrates closed-loop control of the temperature.

DETAILED DESCRIPTION OF EMBODIMENTS

Figure 1:
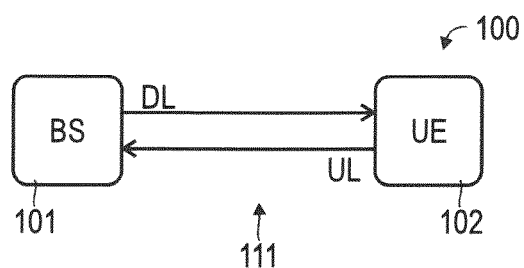
FIG. 1 schematically illustrates a network including a BS and the UE configured to communicate via a wireless link according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of mitigating overheating events are described. Such techniques may find particular application in mitigating overheating events in UEs. Often, due to the portable nature of the UEs, UEs may have impaired heat dissipation capabilities such that overheating events tend to occur more often.

There may be various reasons for overheating events. For example, overheating events may occur due to communication of data on a wireless link. Operation of receiver or transmitter functionality may require significant energy, e.g., for operating analog and/or digital circuitry such as frontends or modems. Communication of data may impose a significant workload on the circuitry. It has been observed that the work load imposed on the circuitry can further increase if MIMO wireless communication and/or carrier aggregation is employed. For example, for operating an analog front end and/or a digital front end with variable antenna weights, significant energy may be required so that there can be a tendency towards overheating events. Likewise, carrier aggregation or high-order modulation and/or coding schemes may impose usage of additional hardware components, and it may result in increased workload and, in turn, in a tendency towards overheating events.

According to various examples, mitigation of overheating events is achieved by tailoring properties of communication of data on a wireless link. In the various examples described herein, properties of communication of uplink (UL) data and/or of downlink (DL) data may be tailored. In particular, it is possible to implement different data rate used for communicating data on the wireless link. It is possible to implement lower data rates to mitigate the overheating event. There may be a tendency to reduce heating at the UE when using smaller data rates. Therefore, if a lower data rate is implemented—e.g., by scheduling data for communication less frequently or reducing an outflow rate of a transmit buffer—the overheating event can be mitigated. The UE can be at least partly in control of the data rate in contrast to reference implementation where the UE simply signals the condition, but the measures are fully taken by the network.

According to examples, data is communicated at a different data rate in response to communicating an UL control signal. Hence, implementation of the different data rate can triggered directly by the UL control signaling. In other words, according to examples, at least one UL control signal is transmitted by the UE to indicate a wish to adjust or modify—i.e., increase or reduce—the data rate. This facilitates reduction of the latency associated with implementing an adjusted data rate. This may be helpful in order to efficiently mitigate the overheating event.

The data rate may relate to an amount of data communicated per time unit across a wireless link. The time unit may be significantly larger than individual resource elements, e.g., may be in the order of a milliseconds or even seconds; hence, the data rate may be associated with some averaging. The data rate is sometimes also referred to as data flow.

One approach of adjusting the data rate in accordance with the details described above is to use reference implementations of stop and wait flow control. Here, data communication is stopped until an acknowledgement has been received. However, for a wireless system and in particular a 3GPP system, there are inactivity timers that monitor the activity on the wireless link. These timers are set to significantly lower values than seconds. Temperature gradients are typically slow, in the order of seconds or several seconds or even minutes. The slow temperature gradient indicates that a stop and wait approach would result in inactivity time-out of the wireless link. Therefore, according to further techniques, the data rate is adjusted using a resource scheduling functionality based on the UL control signal transmitted by the UE. By scheduling small data chunks with an interval that is still within the time window imposed by an inactivity timer, the scheduler can reduce the data rate and keep the wireless link active.

This UL control signal may be preceded or announced by a higher-layer UL control message. For example, an UL control message native to Layer 3 of a communication protocol stack of the wireless link may be used to indicate that a sequence of UL control signals will be transmitted by the UE to implement regulation of the data rate.

The UL control signal may be communicated in response to detecting an overheating event. As such, the UL control signal may be associated with the overheating event. For example, the UL control signal may be indicative of the overheating event. For example, the mere presence of the UL control signal may indicate to the recipient of the UL control signal, e.g., to the BS, that the overheating event occurs at the UE. The UL control signal may include an indicator indicative of an amount of the adjustment of the data rate that is required for mitigating an overheating event. For example, the UL control signal may include an indicator indicative of the difference between an initial data rate used for communicating data prior to communication of the UL control signal and a subsequent data rate used for communicating data after communication of the UL control signal. Such indication could be in terms of predefined increments, thereby defining different states of adjustment need.

The indicator may indicate whether the limitation should be applied to upcoming data transmissions in the uplink direction and/or downlink direction. Thereby, the UE can prioritize DL communication or UL communication, e.g., depending on certain service requirements, etc.

The indicator could be related to the different UE capabilities defined within 3GPP.

In some examples, the network, e.g., the BS, may respond to UL control signal to confirm the requested change of the data rate. The response may include an indicator indicative of the new data rate implemented in response to receiving UL control signal.

Implementing a given data rate may include specifying a threshold data rate that is not to be exceeded. Then, the actual data rate used for communicating data on the wireless link may be equal or below the threshold data rate, e.g., depending on an amount of data in a transmit buffer of the communication protocol stack. For example, if the transmit buffer of the communication protocol stack includes data queued for transmission, the data rate may equal the threshold data rate. If, on the other hand, the transmit buffer is at least temporarily empty, then, the data rate may be smaller than the threshold data rate. In some examples, it is possible that the at least one UL control signal includes an indicator indicative of the threshold data rate. Then, it is possible to implement the data rate for communicating data in accordance with the threshold data rate.

One method of implementing a data rate limitation is to include a ratio of scheduled and non-scheduled subframes. During a non-scheduled subframe, data communication can be conducted between the base station and other UEs connected with the base station, but not between the base station and the particular UE. For example, if the communication of the wireless link includes one non-scheduled subframe every 10 subframes, the data rate is limited with 10%. If in another example a non-scheduled subframe is included every second subframe, the data rate is limited with 50%.

A further technique of implementing such a data rate limitation is to implicitly indicate the threshold data rate, e.g., by indicating an amount of carriers in a carrier aggregation scenario.

FIG. 1 schematically illustrates a wireless communication network 100 which may benefit from the techniques disclosed herein. E.g., the network 100 may be a 3GPP specified network such as 3G, 4G and upcoming 5G. Other examples include point-to-point networks such as Institute of Electrical and Electronics Engineers (IEEE)—specified networks, e.g., the 802.11x Wi-Fi protocol or the BLUETOOTH® protocol.

The network 100 includes a BS 101 and a UE 102. A wireless link 111 is established between the BS 101 and the UE 102. The link 111 includes a DL channel from the BS 101 to the UE 102; and further includes an UL channel from the UE 102 to the BS 101. Data—e.g., payload data or control data—can be communicated in UL and DL. TDD and/or frequency-division duplexing (FDD) may be employed for the DL channel and the UL channel. This is facilitated by resource elements of a time-frequency resource mapping.

For example, the UE may be portable. The UE may be battery-powered. The UE may be selected from the group comprising: smartphone; laptop; smart TV; Machine Type Communication (MTC) sensor or actuator. In particular battery powered device may face restrictions with respect to heat dissipation and cooling so that overheating events may occur more likely.

Figure 2:
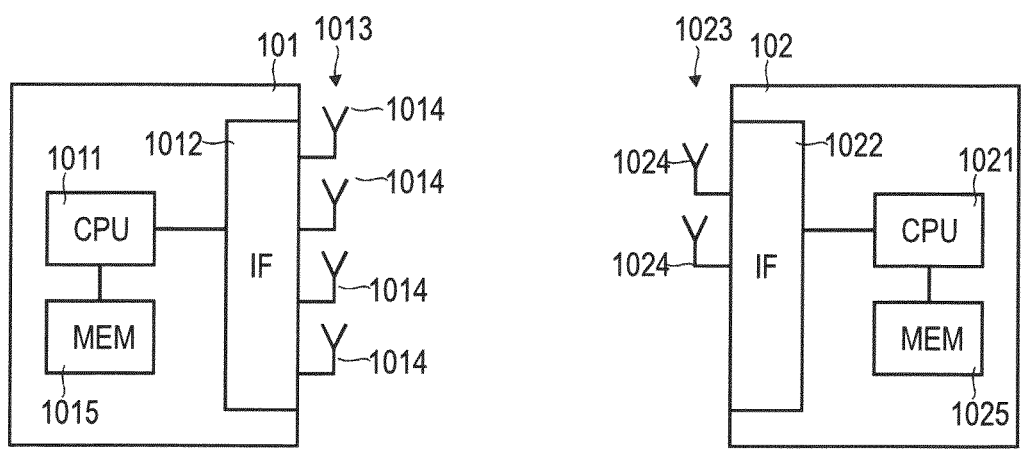
FIG. 2 schematically illustrates details of the BS and the UE according to various examples.

FIG. 2 schematically illustrates the BS 101 and the UE 102 in greater detail. The BS 101 includes a processor 1011 and a transceiver 1012. The transceiver 1012 includes a module 1013 including a plurality of antennas 1014 for MIMO wireless communication. Each antenna 1014 may include one or more electrical traces to carry a radio frequency current. Each antenna 1014 may include one or more LC-phase shifters implemented by the electrical traces. Each traces may radiate electromagnetic waves and when combined can create a certain beam pattern. As such, the antennas 1014 may form an antenna port for providing an output signal. The BS 101 further includes a memory 1015, e.g., a non-volatile memory. The memory may store control instructions that can be executed by the processor 1011. Executing the control instructions causes the processor 1011 to perform techniques with respect to adjusting the data rate to mitigate overheating events at the UE 102.

The UE 102 includes a processor 1021 and a transceiver 1022. The transceiver 1022 includes a module 1023 including a plurality of antennas 1024 for MIMO wireless communication. Each antenna 1024 may include one or more electrical traces to carry a radio frequency current. Each antenna 1024 may include one or more LC-phase shifters implemented by the electrical traces. Each traces may radiate electromagnetic waves and when combined can create a certain beam pattern. As such, the antennas 1024 may form an antenna port for providing an output signal. The UE 102 further includes a memory 1025, e.g., a non-volatile memory. The memory 1025 may store control instructions that can be executed by the processor 1021. Executing the control instructions causes the processor 1021 to perform techniques with respect to adjusting the data rate to mitigate overheating events at the UE 102.

Different spatial streams may be supported between the transceivers 1012, 1022 on the channel 111. The different spatial streams are associated with different antennas 1024 in module 1023 of the UE 102.

In the various examples described herein, it is possible that logic associated with mitigating overheating events at the UE 102 resides fully or partially at the BS 101; likewise, it is possible that logic associated with mitigating overheating events at the UE 102 resides fully or partially at the UE 102.

Overheating events can occur at the UE 102. For example, if complex communication tasks are imposed on the interface 1022, the temperature at the interface 1022 and/or at the processor 1021 may rise above a certain threshold. Then, damage may occur. It has been observed that overheating events are more likely to occur if the communication of data on the wireless link 111 is comparably complex, e.g., uses multiple spatial streams and/or employs carrier aggregation, aggregation of two or more radio access communication technologies, uses a high transmission power for a long period of time, and/or employs a modulation and/or coding scheme having a high constellation.

Figure 3:
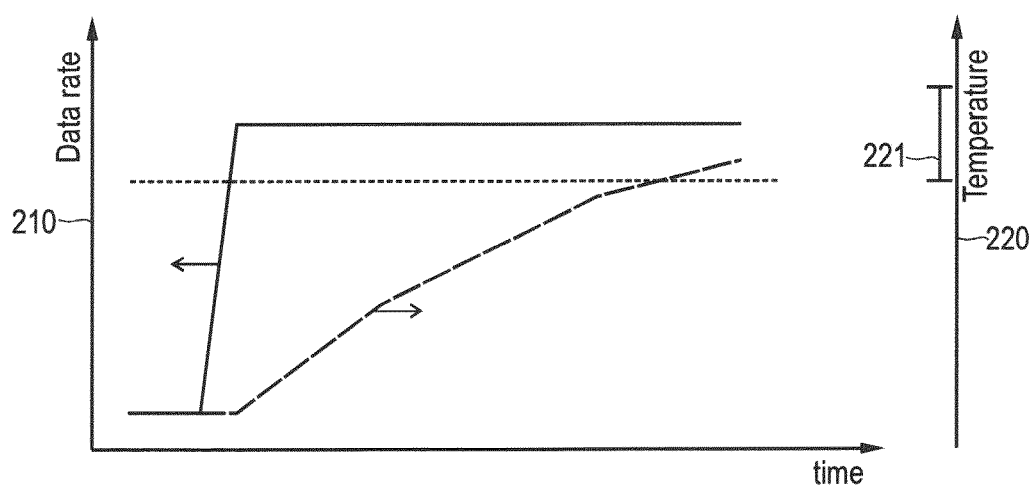
FIG. 3 illustrates a time dependency of the data rate and a temperature associated with an overheating event at the UE according to various examples.

FIG. 3 illustrates aspects with respect to an overheating event 221. In detail, FIG. 3 illustrates a time dependency of the data rate 210 (full line) and a time dependency of a temperature 220 (dashed line) which is associated with the overheating event 221. In particular, an overheating event 221 may occur if the temperature 220 rises above a threshold (horizontal dotted line). The temperature 220 may be the temperature of a circuitry, e.g., of the processor 1021 of the UE 102. The overheating event 221 may generally resolve (not shown in FIG. 3) once the temperature 220 falls below the threshold, e.g., for a certain period of time or with a certain safety margin. Short or temporary drops of the temperature 220 below the threshold may or may not resolve the overheating event 221.

FIG. 3 illustrates a correlation between the data rate 210 and the temperature 220. In particular, while initially a comparably small data rate 210 is used for communicating data, eventually, a larger data rate 210 is used for communicating data. Then, the temperature 220 increases and finally crosses the threshold such that in overheating event 221 occurs.

For example, the overheating event 221 may be due to complex reconstruction, demodulation, or decoding of received data. Then, if the data rate 210 increases, the associated workload increases which generally results in increased heat dissipation. This increases the temperature 220. In particular, computational tasks associated with MIMO reception or MIMO transmission or carrier aggregation or demodulation/decoding can result in significant workload.

Hereinafter, techniques are described which enable to mitigate the overheating event 221. For example, the techniques described herein may enable to pro-actively prevent occurrence of the overheating event 221. Alternatively or additionally, the techniques described herein may enable to provide cooling if an overheating event 221 has occurred.

Figure 4:
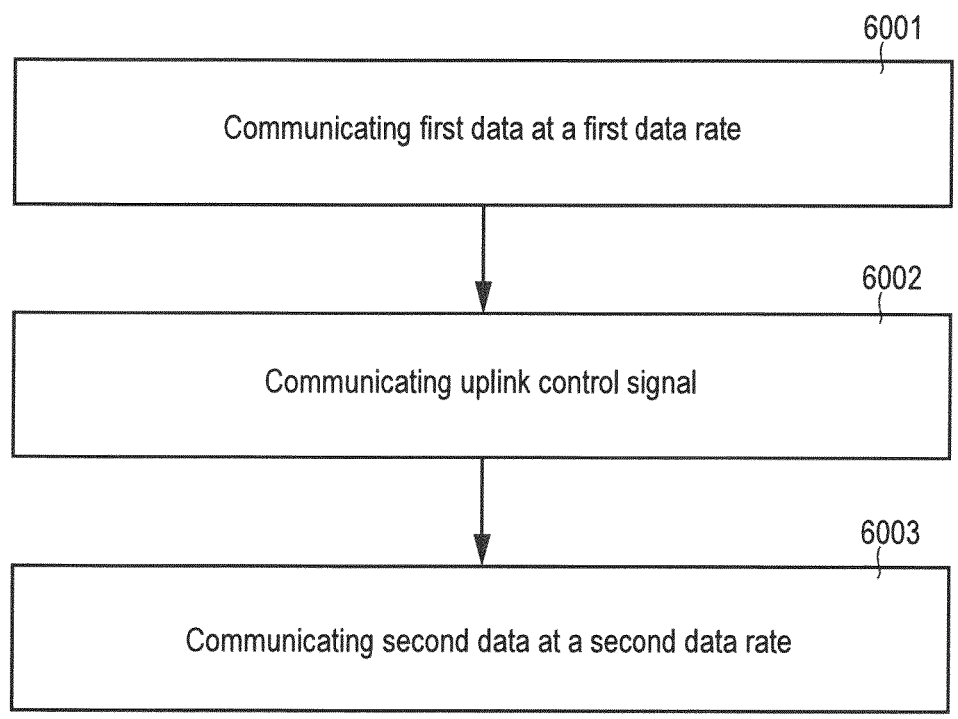
FIG. 4 is a flowchart of a method according to various examples.

FIG. 4 is a flowchart of a method according to various examples. The method according to FIG. 4 allows for mitigating overheating events. For example, the method according to FIG. 4 could be executed by the processor 1011 of the BS 101. It would also be possible that the method according to FIG. 4 is executed by the processor 1021 of the UE 102.

In 6001, first data is transmitted and/or received (communicated) at a first data rate. For example, the first data may be transmitted by the BS 101. It would also be possible that the first data is transmitted by the UE 102. The first data may be received by the BS 101. It would also be possible that the first data is received by the UE 102.

Then, in 6002, one or more UL control signals are communicated. It would be possible that the one or more UL control signals are transmitted by the UE 102. It would be possible that the one or more UL control signals are received by the BS 101.

The UL control signals may be piggybacked on an acknowledgement message. The UL control signals may include one or more symbols which encode information.

The one or more UL control signals are associated with an overheating event at the UE. For example, the one or more UL control signals may be transmitted by the UE in response to detecting the overheating event. Hence, implementation of the second data rate can triggered directly by the UL control signal. Intermediate steps—such as a re-attach or a change of the modulation and/or coding scheme or the MIMO capability—may not be required. For example, the one or more UL control signals may be indicative of the overheating event. For example, the one or more control signals may include an indicator indicative of the overheating event. It would also be possible that the one or more control signals include an indicator indicative of a countermeasure implemented or proposed in view of the overheating event. The countermeasure may include implementing an adjusted data rate for communicating data.

In 6003, second data is communicated on the wireless link at a second data rate. The second data rate is different from the first data rate at which the first data is communicated in 6001. For example, the second data rate may be smaller than the first data rate or larger than the first data rate.

The second data is communicated in 6003 in response to communicating the UL control signal in 6002. Hence, the second data rate is implemented in response to communicating the one or more UL control signals at 6002. For example, the second data rate may be implemented based on an instruction indicated by an indicator included in the UL control signal. For example, the indicator may be indicative of a difference between the first data rate and the second data rate. Such implementation of an adjusted data rate triggered by the UL control signal enables to mitigate the overheating event at a comparably small latency. In particular, if compared to reference implementations where the data rate is adjusted only in response to a change of, e.g., the modulation and/or a coding and/or MIMO scheme, a shorter latency can be provided when mitigating the overheating event.

The first data communicated in 6001 may include UL data and/or DL data. Likewise, the second data communicated in 6003 may include UL data and/or DL data.

Figure 5:
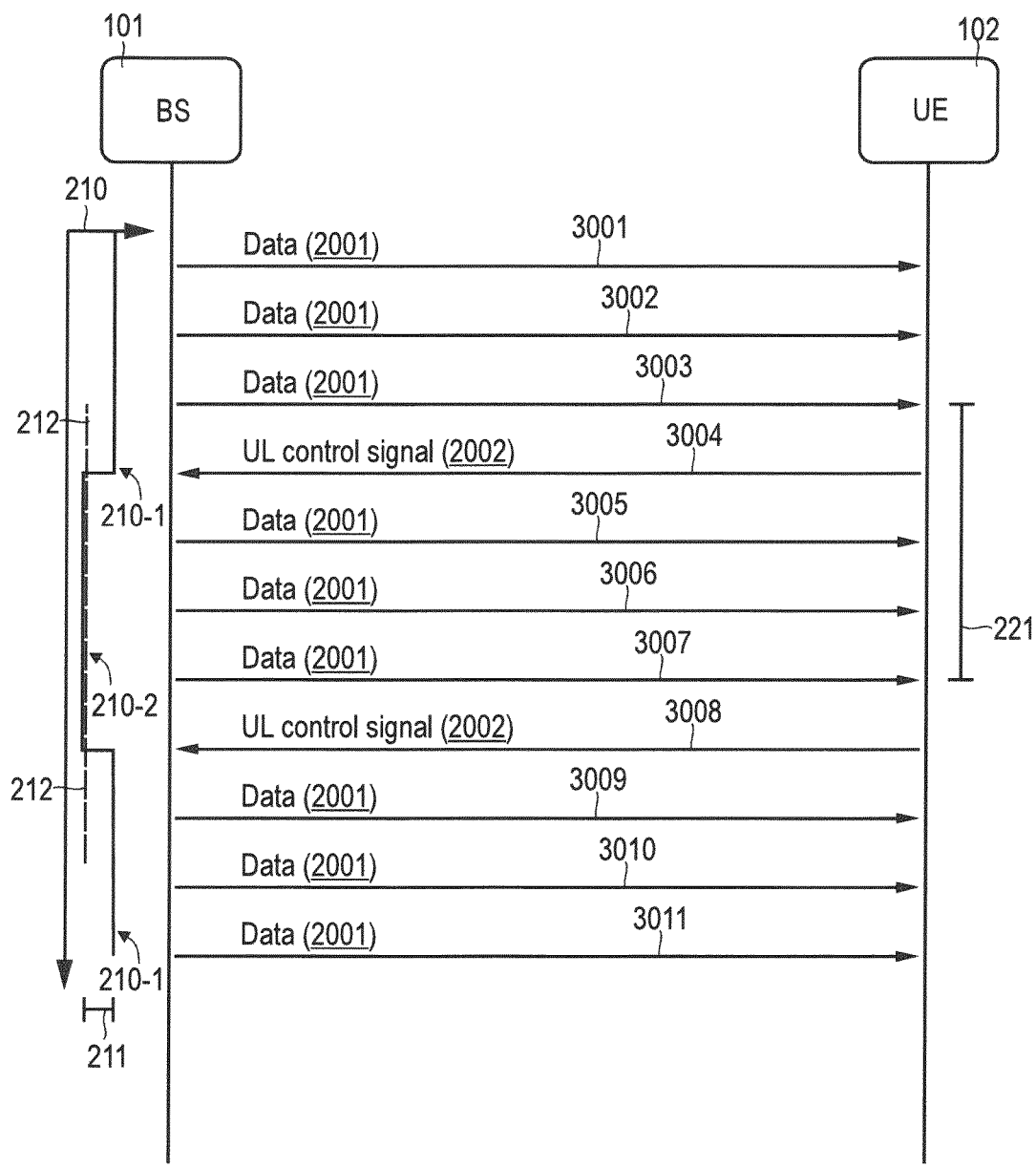
FIG. 5 is a signaling diagram illustrating communication of uplink control signals for mitigating an overheating event at the UE according to various examples, wherein FIG. 5 schematically illustrates communication of downlink data.

FIG. 5 is a signal flow diagram illustrating aspects with respect to communicating data between the BS 101 and the UE 102. FIG. 5 illustrates aspects with respect to adjusting the data rate 210 of said communicating of the data for mitigating an overheating event.

At 3001-3003, DL data 2001 is communicated on the wireless link 111 from the BS 101 to the UE 102. The DL data 201 is communicated at a comparably large data rate 210-1. Thus, eventually, an overheating event 221 occurs.

The UE 102 continuously monitors a temperature and, thus, detects the overheating event 221. For mitigating the overheating event 221, the UE 102 transmits an UL control signal 2002 at 3004. The BS 101 receives the UL control signal 2002 at 3004. In response to receiving the UL control signal 2002, the BS 101 implements a lower data rate 210: DL data 2001 is communicated at 3005-3007 at the lower data rate 210-2. This results in a decreasing temperature at the UE 102 and, eventually, the overheating event 221 resolves.

The UE 102 then transmits another UL control signal 2002 at 3008 and, in response to receiving the UL control signal 2002 at 3008, the BS 101 again implements the higher data rate 210-1. DL data at 2001 is then communicated at 3009-3011 at the higher data rate 210-1.

FIG. 5 also illustrates aspects with respect to a threshold data rate 212. The threshold data rate 212 sets an upper limit for the data rate 210-2 with which the DL data 2001 is communicated at 3005-3007, i.e., in response to the UL control signal 2002 communicated at 3004. For example, it would be possible that the UL control signal 2002 includes an indicator explicitly or implicitly indicative of the threshold data rate 212. Then, it may be possible that the BS 101 implements the lower data rate 210-2 according to which the DL data 2001 is communicated at 3005-3007 in accordance with the threshold data rate 212. Hence, it may be possible that the BS 101 limits the lower data rate 210-2 accordingly. For example, the threshold data rate 212 may be explicitly indicated in absolute terms, e.g., by specifying the threshold data rate 212 in bits per second, etc. Alternatively, the threshold data rate 212 may be implicitly indicated, e.g., by specifying the count of carriers in a carrier aggregation scenario.

In the example of FIG. 5, the lower data rate 210-2 is continuously limited by the threshold data rate 212. This may be because there is DL data 2001 scheduled for transmission by the BS 101 in a transmit buffer of a communication protocol stack. Then, there may be no dead times during which there is no DL data 2001 available for transmission. This is why the lower data rate 210-2, in the example of FIG. 5, equals the threshold data rate 212. In other examples, the lower data rate 210-2 may at least temporarily drop below the threshold data rate 212.

In FIG. 5, the difference 211 between the threshold data rate 212 and the higher data rate 210-1 is illustrated. According to some examples, the difference 211 may be predefined, e.g., in relative terms with respect to the initial, higher data rate 210-1. E.g., the difference 211 may be in the range of +/−30%, or +/−20%, or +/−10% change if compared to the initial higher data rate 210-1. Alternatively or additionally, it would also be possible to include an indicator in the UL control signal 2002 communicated at 3004 which is indicative of the difference 211. For example, it would be possible to dimension the difference 211 larger for larger temperatures associated with the overheating event 221, and vice versa.

The threshold data rate 212 may or may not be smaller than the maximum data rate that is supported by parameters of the communication protocol stack of the wireless link 111 in accordance to the modulation and/or coding scheme used for said communicating of the data 2001 in 3005-3007. The maximum data rate may be the maximum nominal data rate achievable by the given modulation and/or coding scheme employed for communicating the data 2001. The maximum data rate may be the maximum nominal data rate achievable by the given MIMO capability, e.g., MIMO rank or number of spatial streams. The maximum data rate may be the maximum nominal data rate achievable by the given level of carrier aggregation. By dimensioning the threshold data rate 212 to be smaller than the maximum data rate that is supported by the parameters of the communication protocol stack, it is possible to reduce the workload imposed on control circuitry of the UE 102—while maintaining the capability to increase the data rate on a short timescale, e.g., up to the maximum data rate, once the overheating event has resolved. In particular, it can be then possible to increase the data rate on the short timescale, e.g., up to the maximum data rate, without having to reconfigure the MIMO capability, the modulation and/or coding scheme, and/or the 31902 aggregation. For example, between implementing the lower data rate 210-2 and the higher data rate 210-1, it may not be required to reconfigure the MIMO capability, the modulation and/or coding scheme, and/or the carrier aggregation. This enables to implement adjusted data rates 210 on a short timescale, thereby increasing the flexibility in mitigating the overheating event and giving the possibility maximize the overall aggregated network data throughput. This is an example implementation: in other examples, the MIMO capability, the modulation and/or coding scheme, and/or the carrier aggregation may be reconfigured to implement the lower data rate 210-2.

In the example of FIG. 5, DL data 2001 is transmitted by the BS 101 and received by the UE 102. In other examples, it could also be UL data 2001 which is transmitted by the UE 102 and received by the BS 101 which is subject to adjustment of the data rate 210 for mitigating an overheating event 221. Such an example is illustrated in FIG. 6.

Figure 6:
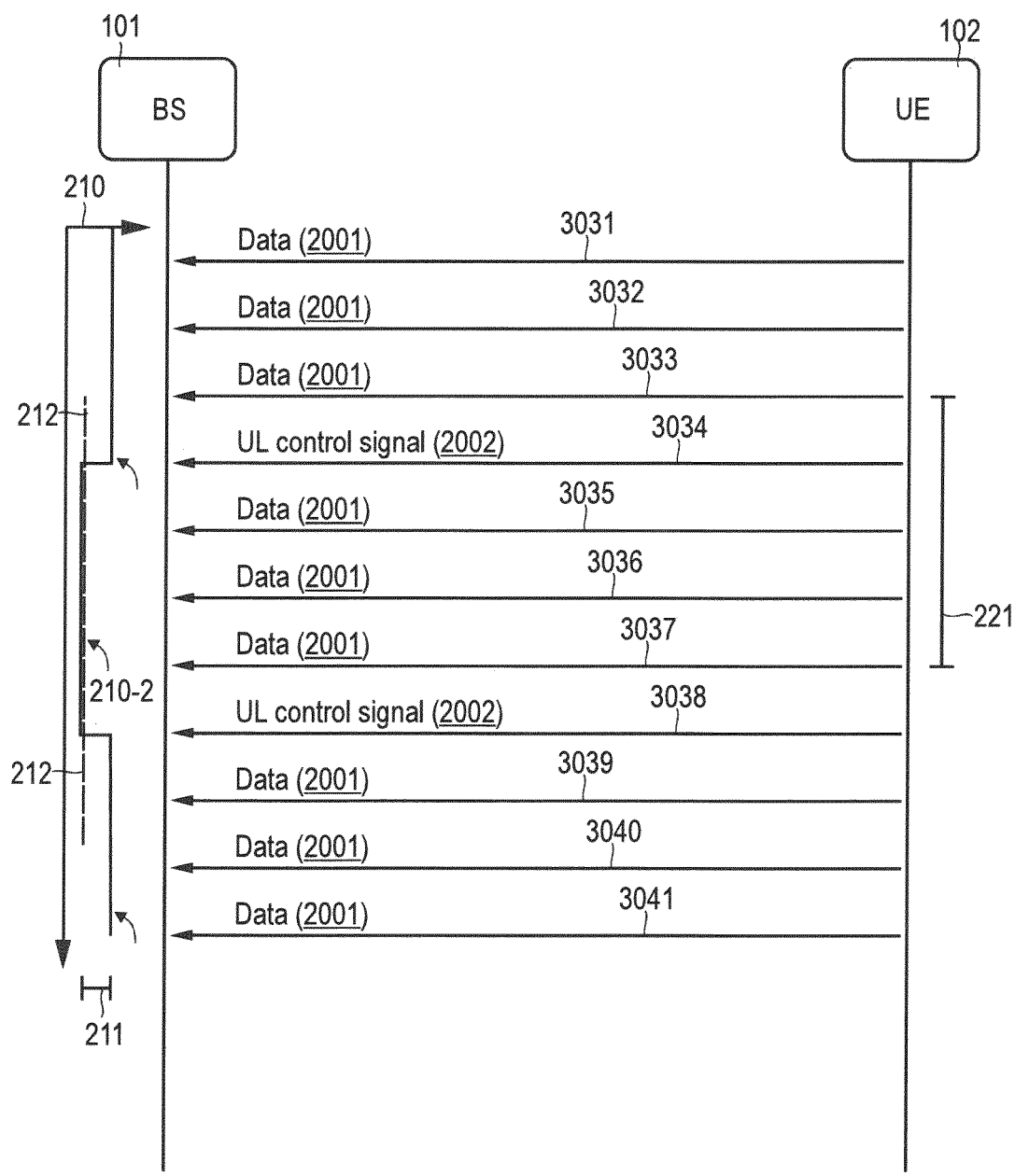
FIG. 6 is a signaling diagram illustrating communication of uplink control signals for mitigating and overheating event at the UE according to various examples, wherein FIG. 6 schematically illustrates communication of uplink data.

FIG. 6 is a signal flow diagram illustrating aspects with respect to communicating data between the BS 101 and the UE 102. FIG. 6 illustrates aspects with respect to adjusting the data rate of said communicating of the data for mitigating an overheating event.

The example of FIG. 6 generally corresponds to the example of FIG. 5. However, at 3031-3033, UL data 2001 is communicated from the UE 102 to the BS 101. Then, the overheating event 221 occurs and, at 3034, the UE 102 again transmits the UL control signal 2002. Based on the UL control signal 2002 and the buffer status report from the UE 102, the BS 101 will provide scheduling grants according to a lower data rate 210-2.

Subsequently, at 3035-3037, the UE 102 transmits UL data 2001 at a lower data rate 210-2 if compared to the higher data rate 210-1 used for communication of the UL data 2001 at 3031-3033.

Once the overheating event 221 has resolved, the UE 102 transmits an UL control signal 2002 at 3038 and then transmits the UL data 2001 at 3039-3041 again at the higher data rate 210-1.

In the scenarios of FIGS. 5 and 6 and, generally, the various examples described herein, there are various techniques conceivable for implementing adjusted data rates 210, 210-1, 210-2, i.e., throttling techniques.

Figure 7:
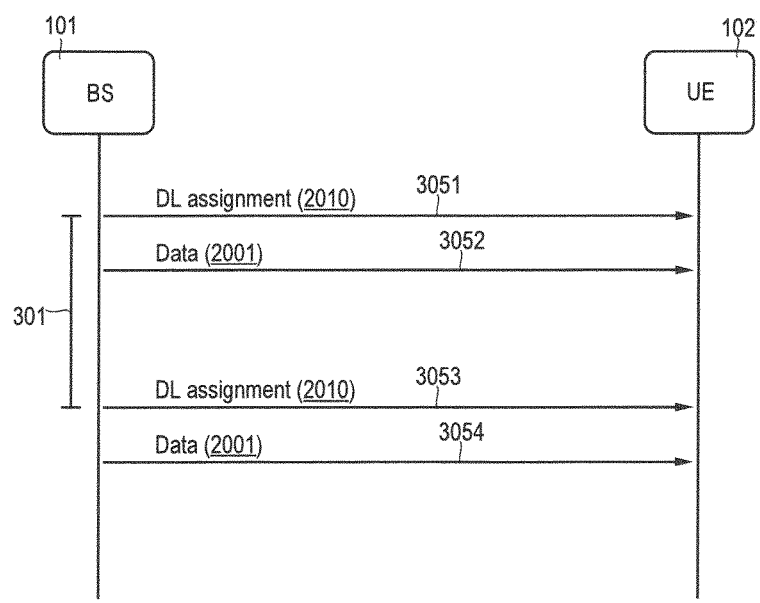
FIG. 7 is a signaling diagram illustrating implementing a data rate in accordance with an uplink control signal by changing a scheduling rate for allocating resources for communicating data on the wireless link according to various examples.

FIG. 7 illustrates aspects with respect to implementing an adjusted data rate 210, 210-1, 210-2. According to the example of FIG. 7, a given data rate 210, 210-1, 210-2 is implemented by changing a scheduling rate 301 of resources allocated for communicating of DL data 2001. Similar techniques may also be employed for communicating UL data 2001.

The scheduling rate 301 may generally define the number of resources allocated per time unit. This scheduling rate may be adjusted by changing a time between subsequent scheduling occasions and/or changing the number of resources per scheduling occasion.

In FIG. 7, a DL assignment 2010 is transmitted by the BS 101 and received by the UE 102, 3051 (in the case of UL data 2001, a UL grant would be transmitted). The DL assignment 2010 is associated with a scheduling occasion. For example, the DL assignment 2010 may be communicated on a DL control channel, e.g., in the case of 3GPP LTE on the physical DL control channel (PDCCH). The DL assignment 2010 is indicative of one or more time-frequency resource elements of a time-frequency resource mapping implemented by the wireless link 111.

For example, the time-frequency resource mapping may include multiple resource elements which are associated with symbols of a modulation scheme. For example, the frequency bandwidth of an individual resource element may correspond to the frequency bandwidth of a subcarrier of a Orthogonal Frequency Division Multiplexing (OFDM) modulation and coding scheme.

Then, at 3052, DL data 2001 is transmitted by the BS 101 and received by the UE 102. The DL data 2001 is communicated in the one or more time-frequency resource elements indicated by the DL assignment 2010 communicated at 3051. For example, the DL data 2001 communicated at 3052 may be payload data. For example, in the case of 3GPP LTE, the DL data 2001 may be communicated in a Physical DL Shared Channel (PDSCH) at 3052.

After a while, another DL assignment 2010 is communicated at 3053 and associated DL data 2001 is communicated at 3054. The timing between the subsequent DL assignments 2010 or scheduling occasions correlates with the scheduling rate 301. For higher (lower) scheduling rates 301, higher (lower) data rates 210, 210-1, 210-2 are obtained. Alternatively or additionally, different scheduling rates 301 could also be implemented by changing the count of resources elements per scheduling occasion. For example, a scheduler functionality of the BS 101 may be configured to set the scheduling rate 301 depending on the required data rate 210, 210-1, 210-2. By adjusting the scheduling rate 301, it is possible to adjust a duty cycle of the interface 1022 of the UE 102. By reducing the scheduling rate 301, the interface 1022 of the UE 102 may receive or transmit data less frequently; thereby, reducing the amount of heat generated.

Figure 8:
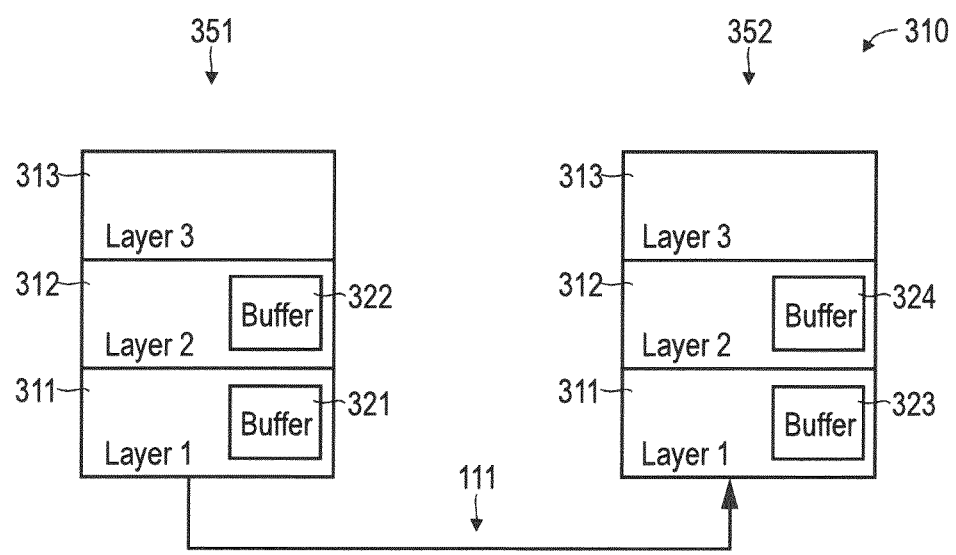
FIG. 8 schematically illustrates implementing a data rate in accordance with an uplink control signal by changing an outflow rate of a transmit buffer of a communication protocol stack of the wireless link according to various examples.

FIG. 8 illustrates aspects with respect to implementing an adjusted data rate 210, 210-1, 210-2. According to the example of FIG. 8, a given data rate 210, 210-1, 210-2 is implemented by changing an outflow rate of a transmit buffer 321, 322 for communicating data 2001 on the wireless link 111.

FIG. 8 illustrates aspects with respect to a communication protocol stack 310 implemented for communication on the wireless link 111. The communication protocol stack 310 includes a transmit section 351 and receive section 352. Depending on the directivity of the communicated data, the transmit section 351 may be implemented by the BS 101 for DL data or by the UE 102 for UL data. For bi-directional communication, both, BS 101 and UE 102 implement the transmit section 351 and the receive section 352.

The communication protocol stack 310 includes multiple layers 311-313. The lowest layer 311 is Layer 1, sometimes also referred to as the physical layer. Next up in hierarchy is the layer 312, referred to as Layer 2 or data link layer. Still further up in hierarchy is the layer 313, referred to as Layer 3 or network layer. See, for example, International Telecommunication Union ITU-T X.200 (July 1994), section 7.

Different layers 311-313 may be associated with different native data units that are handled and processed by that layer 311-313. For example, the layer 311 may sometimes be associated with so-called transport blocks, e.g., of fixed size. The layer 312 may be associated with service data units and packet data units of variable size. Likewise, the layer 313 may be associated with frames or datagrams. Concatenation and/or segmentation may be employed between native data units at the boundaries between the different layers 311-313.

FIG. 8 also illustrates aspects with respect to buffers 321-324. Transmit buffers 321, 322 are provided for the layers 311, 312; corresponding receive buffers 323, 324 are also provided. The respective native data units can be queued in the respective transmit buffers 321, 322. By changing the outflow rate of one or more of the transmit buffers 321, 322 it is possible to implement a given data rate 210, 210-1, 210-2. For example, a higher (lower) outflow rate corresponds to a higher (lower) data rate 210, 210-1, 210-2. The outflow rate may define how many data units are retrieved from the respective transmit buffer 321, 322 per time unit.

As illustrated in FIG. 8, it is possible to use different outflow rates of low-level transmit buffers 321, 322 of the layers 311, 312. This enables to implement different data rates 210, 210-1, 210-2 at a low latency. This is because the time between outflow of a given native data unit from the respective transmit buffer 321, 322 to transmission via the wireless link 111 is comparably low for the lower layers 311, 312.

Figure 9:
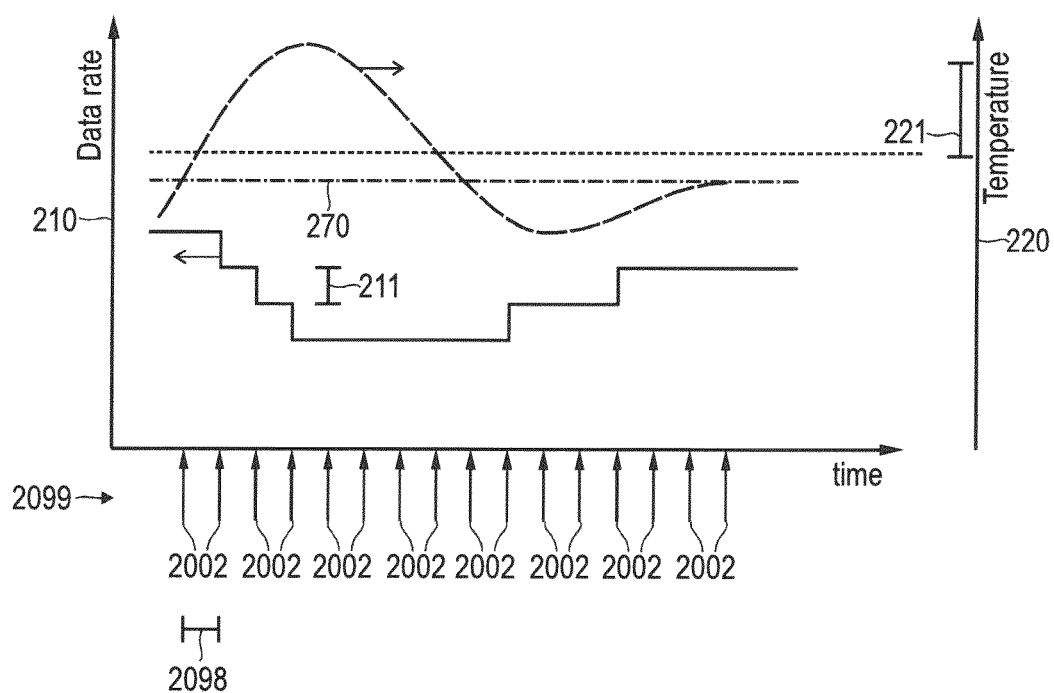

FIG. 9 illustrates aspects with respect to communicating a sequence 2099 of UL control signals 2002. In FIG. 9, the time dependency of the data rate 210 is illustrated (solid line). Furthermore, in FIG. 9, the time dependency of the temperature 220 associated with an overheating event 221 is illustrated (dashed line). The example of FIG. 9 generally corresponds to the example of FIG. 3.

In the example of FIG. 9, a sequence 2099 of UL control signals 2002 is communicated. Different data rates 210 are incrementally implemented using multiple subsequent adjustments in response to communicating each UL control signals 2002 of the sequence 2099. The difference 211 of the data rates implemented prior to and after such an incremental adjustment is illustrated in FIG. 9 for illustrative purposes. The difference 211 may be defined in relative terms, e.g., with respect to the respective data rate implemented prior to an incremental adjustment.

To facilitate such an incremental implementation of the data rate 210, it would be possible that the various UL control signals 2002 include indicators which are indicative of a sign of the difference 211 of an incremental adjustment. Optionally, the various UL control signals 2002 could also be indicative of the magnitude of the difference 211 of an incremental adjustment, e.g., in relative or absolute terms. Alternatively, a predefined magnitude may be used.

It is possible that the UE 102 monitors the temperature 220 which is associated with the overheating event 221. Then, the respective indicator included in the UL control signals 2002 can be repeatedly adjusted based on said monitoring.

By using the UL control signals 2002 which include indicators indicative of the sign or the magnitude of the difference 211 of an incremental adjustment to the implemented data rate, the signaling overhead can be reduced. In particular, a size of the corresponding indicator can be comparably small if compared to the size of indicators which indicate the temperature 220 or the required data rate in absolute terms. This facilitates communication of multiple UL control signals 2002.

Again, it would be possible that incremental adjustments to the data rate 210 are implemented in accordance with a threshold data rate (not illustrated in FIG. 9). For example, the difference 211 indicated by respective indicators may be associated with the respective threshold data rate. Then, if no or only a limited amount of data is to be transmitted, the actual data rate 210 can fall below the threshold data rate which is incrementally changed.

FIG. 9 also illustrates a time interval 2098 between adjacent UL control signals 2002 of the sequence 2099. In some examples, communication of the UL control signals 2002 may occur at a high repetition rate. For example, an average time interval 2098 may not be larger than 10 seconds, further optionally not larger than 1 second, further optionally not larger than 200 milliseconds, optionally not larger than 20 milliseconds, further optionally not larger than 1 millisecond. Thereby, it may be possible to facilitate low-latency mitigation of the overheating event 221. For example, adjacent UL control signals 2002 of the sequence 2099 may be communicated in adjacent frames or subframes of a transmission protocol of the wireless link 111.

For example, such a short time interval 2098 can be facilitated if the UL control signals 2002 are piggybacked on control messages, e.g., automatic repeat request (ARQ) control messages such as positive or negative acknowledgments that may be communicated on a Physical Hybrid-ARQ Indicator Channel (PHICH). Such techniques may be generally applied to the various examples described herein. Generally, instead of an ARQ control message it would be possible to piggyback to other control messages, e.g., the Medium Access (MAC) CE part of the MAC control message, preferably for uplink control, and CSI similar indications to control the downlink data rate.

The time intervals 2098 may be fixed, i.e., the UL control signals 2002 may be communicated at a fixed periodicity. The time intervals 2098 may vary, e.g., according to the varying temperature at the UE.

It may not be required to communicate the UL control signals 2002 if there is no adjustment to the implemented data rate 210 (cf. flat regions of the full line in FIG. 9). Thus, while in FIG. 9 UL control signals 2002 are communicated at a fixed periodicity, in other examples, it would be possible to, e.g., only communicate the UL control signals 2002 if there are adjustments to the implemented data rate 210.

As will be appreciated from FIG. 9, it is possible to provide a closed-loop control of the temperature 220 associated with the overheating event 221 based on said incremental implementation of a certain data rate 210. Implementing adjusted data rates can serve as the corrective action of the closed-loop control.

In FIG. 9, a set temperature 270 is illustrated; the temperature 220 is regulated towards this set temperature 270. Overshoots and undershoots of a transient phase are illustrated. Finally, the temperature 220 settles close to the set temperature 270. The set temperature 270 is dimensioned to be adjacent to the threshold associated with the overheating event 221; this maximizes the data throughput. In particular, by using the UL control signals 2002, a feedback can be provided which indicates the impact of the difference 211 associated with an incremental adjustment of the data rate 210 on the temperature 220. By providing such a feedback, different sensitivities of the temperature 220 on the incremental changes—as encountered for different types of UEs 102 or even for UEs 102 which operate in different environments—may be taken into account. Thereby, unnecessary reduction of the data rate 210 is avoided and the overall throughput of data may be maximized—while still mitigating overheating events 221.

To further facilitate low-latency communication of the UL control signals 2002—which may be of particular relevance when implementing the closed-loop control of the temperature 220—, it is possible that the UL control signals 220 are native to one of the lower layers 311, 312 of the transmission protocol stack 310 of the wireless link 111, i.e., to Layer 1 or Layer 2.

Sometimes, it may be desirable to appropriately configure such a closed-loop control of the temperature 220 between the BS 101 and the UE 102.

Figure 10:
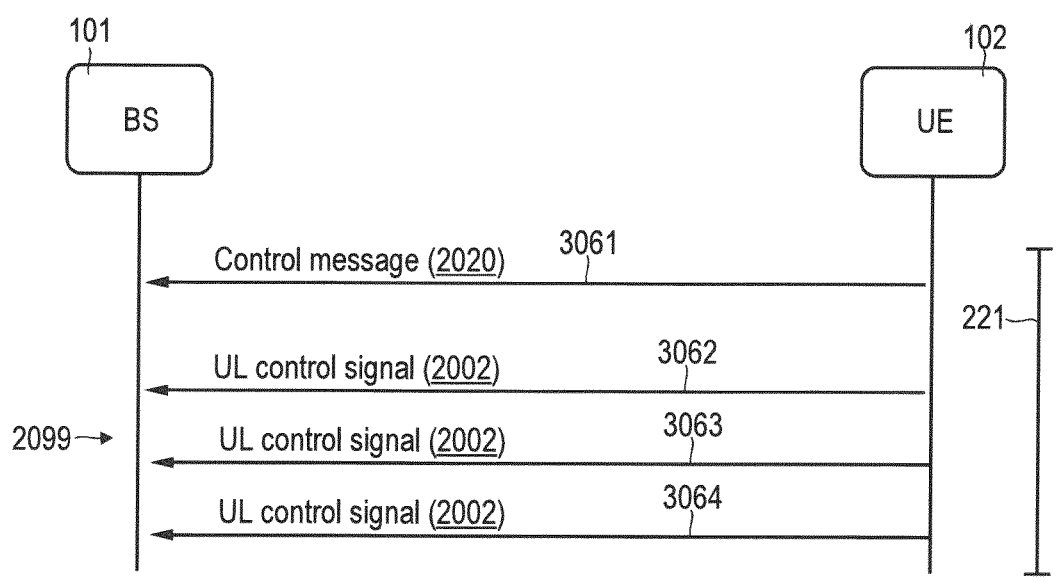
FIG. 10 is a signaling diagram schematically illustrating communication of an uplink control message from the UE to the BS according to various examples.

FIG. 10 illustrates aspects with respect to communicating an UL control message 2020 from the UE 102 to the BS 101. The UL control message 2020 is communicated at 3061, i.e., transmitted by the UE 102 and received by the BS 101. Communicating the UL control message 2020 triggers subsequent communication of a sequence 2099 of UL control signals 2002 at 3062-3064.

For example, it would be possible to provide a closed-loop control of the temperature 220 associated with the overheating event 221 based on incremental adjustments of the data rate implemented in response to communicating the various UL control signals 2002. It would be possible that the control message 2020 is indicative of certain properties of the closed-loop control. For example, the control message 2020 could be indicative of reoccurring time-frequency resources used for communicating the UL control signals 2002 of the sequence 2099. Alternatively or additionally, the control message 2020 could be indicative of the difference 211 of an incremental adjustment of the data rate 210, e.g., the magnitude thereof; as such, the difference 211 may be predefined with respect to the closed-control. Alternatively or additionally, the control message 2020 could be indicative of the time interval 2098 between adjacent UL control signals 2002 of the sequence 2099. Potentially the BS 101 may reply with a response message acknowledging that the UE is allowed to initiate data rate control.

To accommodate such complex information, it would be possible that the UL control message 2020 is native to a higher layer 312, 313 of the transmission protocol stack 310 if compared to the native layer of the UL control signals 2002. For example, if the UL control signals 2002 are native to layer 311, the UL control message 2020 could be native to layer 312 or layer 313.

Figure 11:
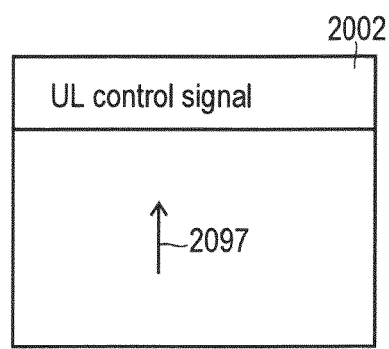
FIG. 11 schematically illustrates an uplink control signal according to various examples.

FIG. 11 illustrates aspects with respect to the UL control signal 2002. In the example of FIG. 11, the UL control signal 2002 includes an indicator 2097 which is indicative of the sign of the difference 211 of an incremental change of the data rate 210. In the example of FIG. 11, the indicator is indicative of a positive difference 211 of the associated incremental change of the data rate 210. Hence, an increased data rate 210 is implemented.

Figure 12:
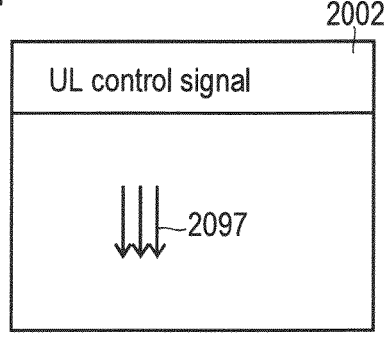
FIG. 12 schematically illustrates an uplink control signal according to various examples.

FIG. 12 illustrates aspects with respect to the UL control signal 2002. In the example of FIG. 11, the UL control signal 2002 includes an indicator 2097 which is indicative of, both, the sign and the magnitude of the difference 211 of an incremental change of the data rate 210. In the example of FIG. 12, the indicator 2097 is indicative of a comparably large negative difference 211 of the associated incremental change of the data rate 210. Hence, a strongly reduced data rate 210 implemented.

In the various examples described herein, it would be possible that the indicator 2097 which may be included in the UL control signal 2002 has a limited length. For example, the indicator 2097 could be a 1-bit or 2-bit or 3-bit in length or generally not larger than 3-bit in length. This facilitates low-latency communication of the UL control signal 2002 and enables a high repetition rate of the UL control signal 2002. Furthermore, such length-limited control signal 2002 may be piggybacked onto other signals.

Figure 13:
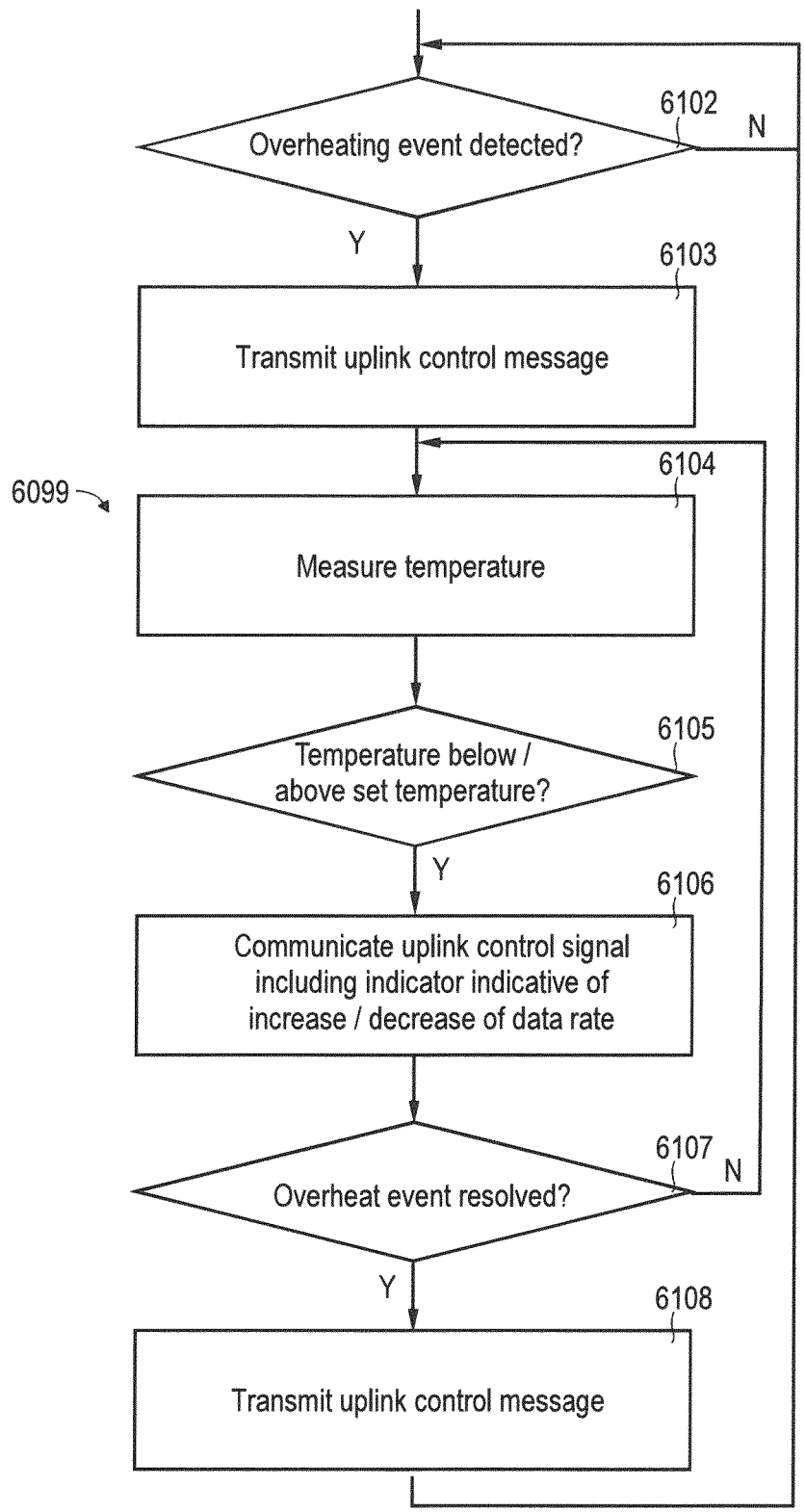
FIG. 13 is a flowchart of a method according to various examples.

FIG. 13 is a flowchart of a method according to various examples. For example, the method according to FIG. 13 may be executed by the processor 1021 of the UE 102.

At 6102, it is checked whether an overheating event 221 is detected. For example, the measured temperature 220 of control circuitry of the UE 102 may be compared to the predefined threshold. The threshold may be specific to the particular UE 102 and/or the operating environment of the UE 102.

If no overheating event is detected at 6102, communicating of the data at the first data rate commences at 6101. If an overheating event 221 is detected at 6102, the method commences at 6103.

At 6103, the higher-layer UL control message 2020 is transmitted by the UE 102. The UL control message 6103 is indicative of the overheating event 221. For example, the UL control message 2020 may include an indicator indicative of the temperature 220 associated with the overheating event 221 which may serve as a seed value for subsequent closed-loop control 6099.

At 6104, the temperature 220 associated with the overheating event 221 is measured. It is then checked, at 6105, whether this temperature 220 is below or above a set temperature 270.

If the temperature is below or above the set temperature, then, at 6106, and UL control signal 2002 is communicated which includes an indicator indicative of an increase or decrease of the data rate 210. As such, the indicator may be indicative of the sign of the difference 211 associated with the incremental change of the data rate. Optionally, the indicator could also be indicative of a magnitude of the difference 211; the magnitude may be determined based on a difference between the temperature 220 and the set temperature 270.

At 6107, it is checked whether the overheating event 221 has resolved. For example, if the temperature 220 has fallen significantly below the lower threshold of the overheating event 221, it can be judged that closed-loop control 6099 of the temperature 220 is not required anymore. Then, a higher-level UL control message can be transmitted at 6108 which informs the BS 101 accordingly.

If the overheating event is judged to not have resolved, then, closed-loop control 6099 proceeds by re-measuring the temperature at another iteration of 6104.

Throughout execution of the method according to the example of FIG. 13, data may be communicated (not illustrated in FIG. 13). The data may be communicated in accordance with a data rate implemented in accordance with the uplink control signal communicated at subsequent iterations of 6106. Throughout the method according to the example of FIG. 13 and, in particular, throughout the closed-loop control 6099, it would be possible to maintain one and the same modulation scheme, coding scheme, and MIMO scheme for the communication of data. In particular, it can be expendable to adjust a UE category which is associated with a particular modulation and/or coding scheme. See for example 3GPP Technical Specification 36.306 V14.2.0. Likewise, the MIMO rank may be maintained. Instead of changing such underlying properties of the communication, it is rather possible to directly implement changes to the data rate 210, e.g., by appropriately scheduling and/or retrieving data from a transmit buffer.

In FIG. 13, the closed-loop control is triggered by an overheating event at 6102. In other examples, the closed-loop control 6099 could also be triggered if the temperature falls below a threshold so that the data rate is increased in a controlled fashion.

Summarizing, above, techniques of mitigating overheating events have been described. As will be appreciated from the above, there are different options available for mitigating overheating events. Here, techniques are described which enable to keep the original UE category from the initial registration of the UE, still supporting highest order of modulation and MIMO as configured. This supports the network using the most efficient method to communicate data on a wireless link, maximum utilization of the radio resources, etc.

A dynamic control of the scheduler is described to regulate the data rate and, thereby, the work load imposed on the UE. Alternatively or additionally to controlling scheduling, it would also be possible to control the outflow rate of a transmit buffer to regulate the data rate.

Various techniques described herein are based on the finding that heat dissipation can occur slower in time domain if compared to conventional data-flow control. Therefore, legacy data-flow control may be enhanced to mitigate overheating events. In particular, legacy acknowledgment timers/inactivity timers may be unsuited for mitigating overheating events.

According to examples, the data rate is controlled by piggybacking UL control signals on ARQ control messages. Generally, an UL control signal may be communicated from the UE to the BS which is indicative that the UE requires a modification of the data rate. By changing the data rate, the duty cycle of a modem of the UE can be relaxed such that the heat dissipation reduces.

In some examples, an UL control signal can be indicative of a sign of a difference between incremental implementations of adjusted data rates. This could be denoted as ACK+"up" and ACK+"down". Thereby, it is possible to provide a large data throughput while still mitigating overheating events. By such techniques, the BS can control the data throughput and mitigate overheating events while still taking into account varying requirements for different UEs. For example, different UEs or UEs operating in different environments may show different characteristics with respect to heat transfer or temperature stabilization. Thus, the dataflow is not unnecessarily throttled down.

Incremental changes to the data rate corresponds to step functions, where each step may be defined in relative terms, e.g., +/−10% if compared to the previously implemented data rate (applying to a 2-bit implementation of an indicator included in the UL control signal). It would also be possible to indicate the magnitude of the step with higher resolution, e.g., +/−10%, 20%, 30%, 40%.

Above, techniques with respect to implementing such a closed-loop control have also been explained in view of control signaling. For example, if the UE detects an overheating event—or, generally, any other reason for limiting the data rate—, the UE can transmit a UL control signal. The UL control signal could be part of a hybrid ARQ acknowledgment/negative acknowledgment message or a separate Layer 1 message valid for a specific wireless link. The UL control signal could also be a Radio Resource Control (RRC) message, or generally a Layer 2 or Layer 3 message. Such a message may be valid for a complete PDU session. The UL control signal may include a step indicator, wherein the step indicator is indicative of the amount of reduction or increase of the data rate required. This may be in terms of a reduced scheduling rate/duty cycle or a target maximum average data rate.

The UE may further indicative the reduction/increase of the data rate is required for, both, UL data and DL data, or selectively required for a specific direction. Thereby, a prioritization of DL data vis-à-vis UL data, or vice versa, can be achieved. For 3GPP 5G, the UE may further indicate a preference of the radio access technology is configured to use LTE—New Radio (NR) dual connectivity. For example, it could be indicated whether the adjustment of the data rate applies to 3GPP LTE and/or 3GPP NR.

Such techniques can be seen as a state machine control where each implemented data rate corresponds to certain state. The network may send a response to confirm the current state of the UE overheating event. The response by the network may include a network indicated target data rate which may or may not be the same as the data rate requested by the UE.

As will be appreciated from the above, by such techniques, the UE can inform the network about an overheating event. The UE can request a certain reduction of the data rate required to mitigate the overheating event. The network—when informed about the overheating event—keeps in charge of the access to take and may or may not consider the suggestions by the UE. The UE can be informed about the decision of the network, as a response to the UE indication. The UE can inform about a further need to reduce the power consumption, by sending a sequence of UL control signals. The UE can inform in the overheating event has resolved.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various examples have been described with respect to tailoring communication of UL data or DL data. Similar techniques may also be employed for device to device communication on a sidelink channel of the network or relay-mediated communication.

For further illustration, above, various examples have been described with respect to overheating events triggered by MIMO communication. However, overheating events may be triggered at least partially also by other influencing factors, e.g., environmental conditions, workload imposed on circuitry due to applications, etc. The particular reason or mix of reasons for triggering an overheating is not germane for the techniques described herein. Generally, the techniques described herein can be used to tailor the workload imposed on the UE by communicating data and, as such, to controlling the temperature at the UE. Therefore, the particular reason for an overheating event may be of subordinate relevance.

Furthermore, various techniques of closed-loop control of the temperature at the UE have been described in the context of an overheating event. However, generally, closed-loop control of the temperature may not be bound to an overheating event. Closed-loop control of the temperature at the UE could also commence if no overheating event has been detected, but if rather stabilization of the temperature at a set temperature is desired for some other reasons.

For further illustration, various definitions of overheating events are conceivable. For example, an overheating event may be defined with respect to the temperature exceeding a threshold; and resolving once the temperature falls below the threshold or below a further threshold defined with a safety margin with respect to the threshold. The overheating event may be defined with a temporal component, e.g., if the temperature crosses a threshold an remains above the threshold for a certain latency duration. Likewise, the resolving of the overheating event may be defined based on a latency duration of the temperature falling below a threshold. The overheating event may also be defined based on a rate of change of the temperature. For example, if the rate of change of the temperature exceeds a threshold, the overheating event may occur. Again, certain latency may be taken into account.

For still further illustration, above, various examples have been described in which the UL control signal is indicative of a threshold data rate. Threshold data rate may refer to the possibility of implementing the data rate at the threshold data rate or below. As such, the threshold data rate may also be referred to as set data rate or simply data rate, depending on the terminology used. For example, if a transmit buffer includes data queued for transmission, then the actual data rate may equal the threshold data rate and the threshold data rate may consequently be simply referred to as data rate.

For still further illustration, various examples have been described in which the threshold data rate is set below a maximum data rate supported by the parameters of the protocol stack. However, in some examples, the protocol stack may be appropriately configured such that the threshold data rate can equal the threshold data rate.

For still further illustration, various examples have been described in which a throttling technique to implement a reduced data rate does not involve changing a carrier aggregation level; however, this is generally optional and it may also be possible to implement the throttling technique based on a change of the carrier aggregation level.

The invention claimed is:

1. A method, comprising:
communicating, on a wireless link between a network node and a communication device, first data at a first data rate,
communicating, on the wireless link, at least one uplink control signal associated with an overheating event at the communication device, the uplink control signal includes an indicator indicative of at least a number of carriers in a carrier aggregation, and
in response to said communicating of the at least one uplink control signal: communicating, on the wireless link, second data at a second data rate in accordance with the number of carriers,
wherein the second data rate is different from the first data rate.

2. The method of claim 1,
wherein the at least one uplink control signal includes an indicator indicative of a threshold data rate,
wherein the second data is communicated at the second data rate which is implemented in accordance with the threshold data rate.

3. The method of claim 2,
wherein a difference between the first data rate and the threshold data rate is predefined or indicated by an indicator included in the at least one uplink control signal.

4. The method of claim 2,
wherein the threshold data rate is smaller than a maximum data rate supported by parameters of a communication protocol stack of the wireless link in accordance to a modulation and/or coding scheme used for said communicating of the second data.

5. The method of claim 2,
wherein the threshold data rate is a maximum data rate supported by parameters of a communication protocol stack of the wireless link in accordance with by a given level of carrier aggregation.

6. The method of claim 2,
wherein the indicator is indicative of whether the threshold data rate is to be applied to uplink communication and/or downlink communication.

7. The method of claim 1, further comprising:
implementing the second data rate by changing a scheduling rate of resources allocated for said communicating of the second data if compared to the scheduling rate of resources allocated for said communicating of the first data.

8. The method of claim 1, further comprising:
implementing the second data rate by changing an outflow rate of a transmit data buffer for said communicating of the second data if compared to the outflow rate of the transmit data buffer for said communicating of the first data.

9. The method of claim 1,
wherein the at least one uplink control signal comprises a sequence of uplink control signals,
wherein the method further comprises:
incrementally implementing the second data rate in response to communicating uplink control signals of the sequence of uplink control signals.

10. The method of claim 9,
wherein the at least one uplink control signal includes an indicator indicative of the sign and/or magnitude of the difference between incremental implementations of the second data rate.

11. The method of claim 10, further comprising:
monitoring a temperature associated with the overheating event, and
repeatedly adjusting the indicators included in the uplink control signals of the sequence of uplink control signals based on said monitoring.

12. The method of claim 9,
wherein an average time interval between adjacent uplink control signals of the sequence of uplink control signals is not larger than 10 sec, optionally not larger than 1 sec, further optionally not larger than 200 ms, further optionally not larger than 20 ms, further optionally not larger than 1 ms.

13. The method of claim 9, further comprising:
providing a closed-loop control of a temperature associated with the overheating event based on said incrementally implementing of the second data rate.

14. The method of claim 1,
wherein the uplink control signal is native to the Layer 1 or the Layer 2 of a communication protocol stack of the wireless link.

15. The method of claim 14,
wherein the uplink control signal is piggybacked on a Layer 1 automatic repeat request control message, a Layer 2 Medium Access CE message, or a positive/negative acknowledgement message.

16. The method of claim 1,
wherein the at least one uplink control signal comprises a sequence of uplink control signals,
wherein the method further comprises:
communicating an uplink control message indicative of the overheating event,
triggering said communicating of the sequence of uplink control signals in response to said communicating of the uplink control message.

17. The method of claim 16,
wherein the uplink control message is native to a higher layer of a communication protocol stack of the wireless link if compared to the native layer of the at least one uplink control signal.

18. The method of claim 1,
wherein the first data is communicated according to a first modulation and/or coding and/or MIMO scheme,
wherein the second data is communicated according to a second modulation and/or coding and/or MIMO scheme,
wherein the first modulation and/or coding and/or MIMO scheme is the same as the second modulation and/or coding and/or MIMO scheme.

19. The method of claim 1,
wherein the uplink control signal is piggybacked on an automatic repeat request control message.

20. A device, comprising:
a transceiver configured to communicate on a wireless link with a network node; and
control circuitry configured to control the transceiver to:
communicate, on the wireless link between the network node and the device, first data at a first data rate,
communicate, on the wireless link, at least one uplink control signal associated with an overheating event at the device, the uplink control signal includes an indicator indicative of at least a number of carriers in a carrier aggregation, and
in response to said communicating of the at least one uplink control signal: communicate, on the wireless link, second data at a second data rate in accordance with the number of carriers,
wherein the second data rate is different from the first data rate.

* * * * *